Sept. 20, 1960   R. GLAVAN ET AL   2,952,898
METHOD FOR MAKING PILLOW BLOCK SELF-ALIGNING BEARING
Filed Nov. 21, 1957   3 Sheets-Sheet 1

Inventor
Richard Glavan
Robert Lee King
By
Mann, Brown and McWilliams
Attys.

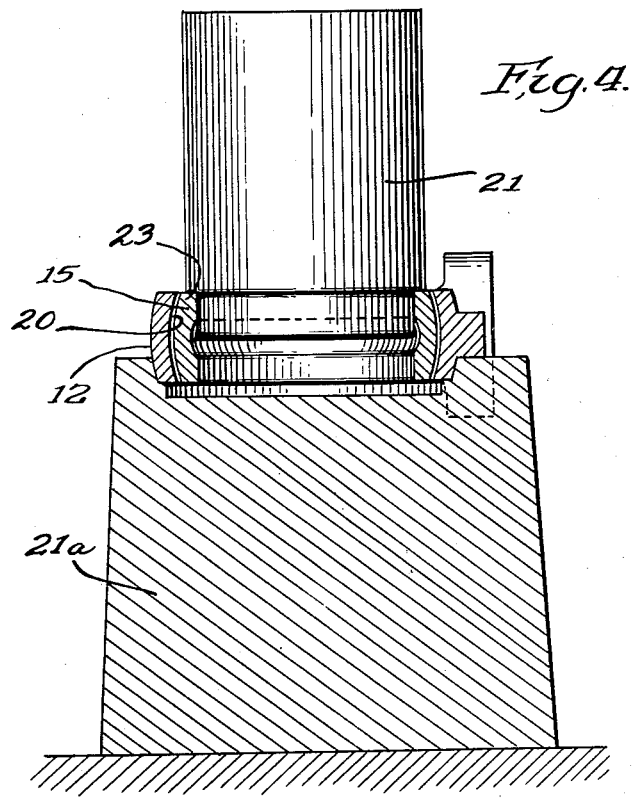
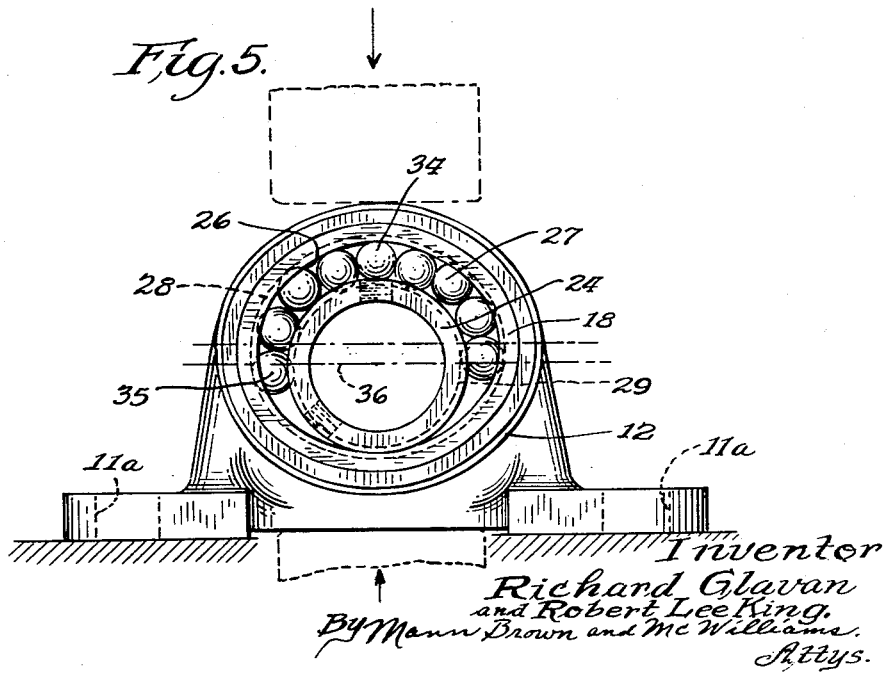

Sept. 20, 1960     R. GLAVAN ET AL     2,952,898
METHOD FOR MAKING PILLOW BLOCK SELF-ALIGNING BEARING
Filed Nov. 21, 1957     3 Sheets-Sheet 3
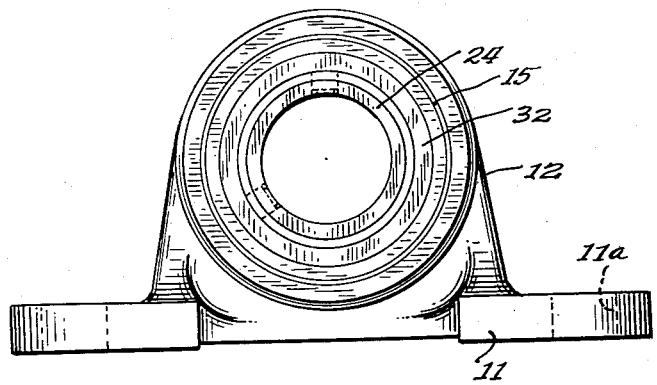
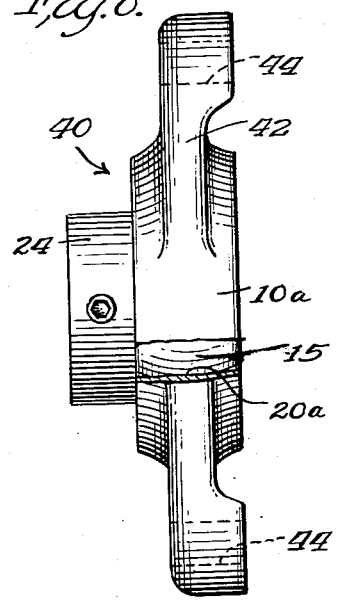
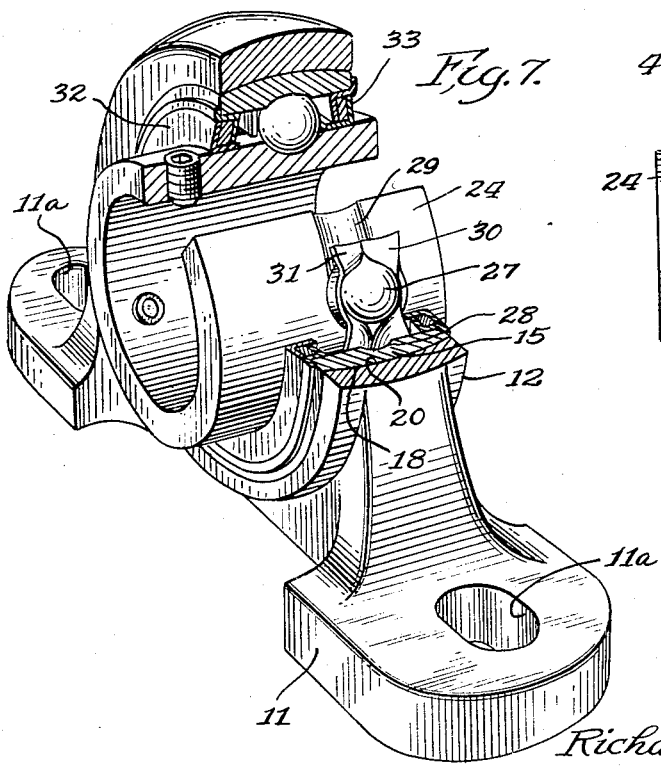
Inventors
Richard Glavan
Robert Lee King.
By Mann, Brown and McWilliams
Attys.

United States Patent Office 2,952,898
Patented Sept. 20, 1960

2,952,898

METHOD FOR MAKING PILLOW BLOCK SELF-ALIGNING BEARING

Richard Glavan, Joliet, and Robert Lee King, Aurora, Ill., assignors to Stephens-Adamson Mfg. Co., a corporation of Illinois Filed Nov. 21, 1957, Ser. No. 697,839

2 Claims. (Cl. 29—148.4)

This invention relates to an improved method for making a pillow block bearing unit of the self-aligning type.

Housings for pillow block bearing units, when of the self-aligning type, are either made in two parts which are clamped together so that the bearing with its spherically shaped outer surface can be mounted within the correspondingly shaped inner surface of the housing, or the housing is provided with mounting slots which permit the bearing to be slipped into place edgewise and then rotated into its normal position.

There are certain inherent disadvantages in pillow block bearing units made either in two parts or with mounting slots. In the former case, there is always the problem of some of the components of the bearing unit being lost or misplaced and of clamping pressures being too little or too great; and in the latter case, the mounting slots tend to weaken the bearing unit, particularly against thrust loads.

A disadvantage common to both of the above types of pillow block bearing units is the fact that to achieve self-aligning characteristics, the inner surface of the pillow block must be machined to a spherical surface by means of a single point tool, which is time-consuming and expensive.

The present invention provides an entirely different approach to the fabrication of pillow block bearing units by employing a ductile material for the housing, such, for example, as ductile cast iron, nodular iron, malleable cast iron, perlitic malleable cast iron, Meehanite, bronze, aluminum-bronze, or the like, and forming the bearing opening with a straight cylindrical wall which can be readily broached, then placing the outer race with its spherical outer surface within the cylindrical cavity, and swaging the ends of the cylindrical wall of the housing into locking engagement with the outer race and forming at the same time a spherical inner surface for the housing which is complementary to the spherical outer surface of the outer bearing race so that the latter has universal movement with respect to the housing. After this is accomplished, the bearing assembly may be completed by disposing an inner race within the outer race and mounting the balls therebetween, preferably applying transverse pressures to the housing with its contained outer ring in order to distort the latter sufficiently to mount between the outer race and the inner race a maximum number of balls.

Not only does our improved process substantially reduce in cost the fabrication of self-aligning, pillow block type bearing units, but it also produces a bearing unit which is vastly superior to bearing units of this type now on the market.

Another important object of this invention is to provide a process which produces a one-piece bearing unit and which firmly locks the outer race of the bearing within the pillow block housing so that it can withstand greater thrust loads than are possible with conventional one-piece pillow block bearing units.

It is of substantial importance that our method conserves material, labor and time and does not involve the use of expensive or complicated machinery.

Further and other objects and advantages of the invention will be apparent as the disclosure proceeds and the description is read in conjunction with the drawings, in which:

Figure 4 illustrates how the outer race may be freed from binding action caused by the swaging of the pillow block about the outer race;

Figure 5 is a somewhat diagrammatic view showing how a maximum number of balls may be placed between the inner and outer races of the bearing in order to provide maximum load capacity for the bearing;

Figure 6 is a front elevational view of a completed pillow block bearing unit made in accordance with this invention;

Figure 7 is a perspective view, partly in section, showing the completed bearing unit; and Figure 8 is a plan view, with parts broken away, of a flange type bearing unit produced by our method.

Figure 1:
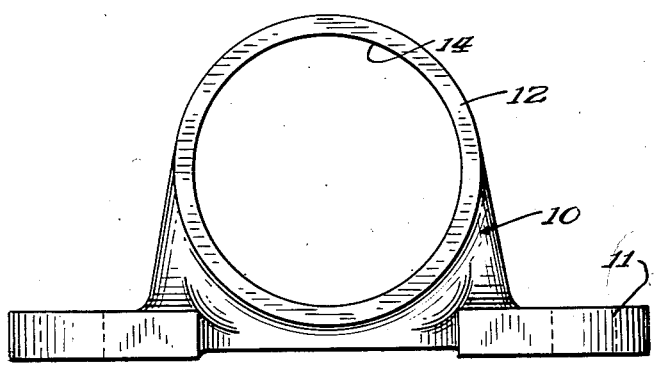
Figure 1 is a front elevational view of a pillow block blank used in the fabrication of the pillow block rolling bearing unit of this invention.
Figure 2:
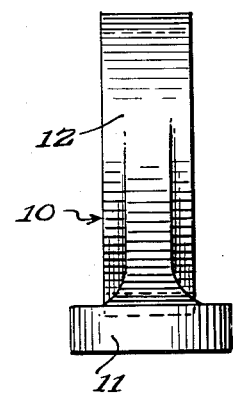
Figure 2 is a side elevational view of the same.

Referring now to the drawings, a pillow block blank 10 is cast or forged of ductile or malleable material, such as ductile cast iron, nodular iron, malleable cast iron, perlitic malleable iron, Meehanite, bronze, aluminum-bronze, or the like; and the block comprises a base 11 having mounting holes for the reception of mounting screws or bolts, and a bearing housing 12, which is integral with the base 11 and of generally circular or ring-like configuration. The housing portion 12 of the pillow block blank has a generally cylindrical opening 14 which may be broached to size, or cast to size by shell or investment molding.

Figure 3:
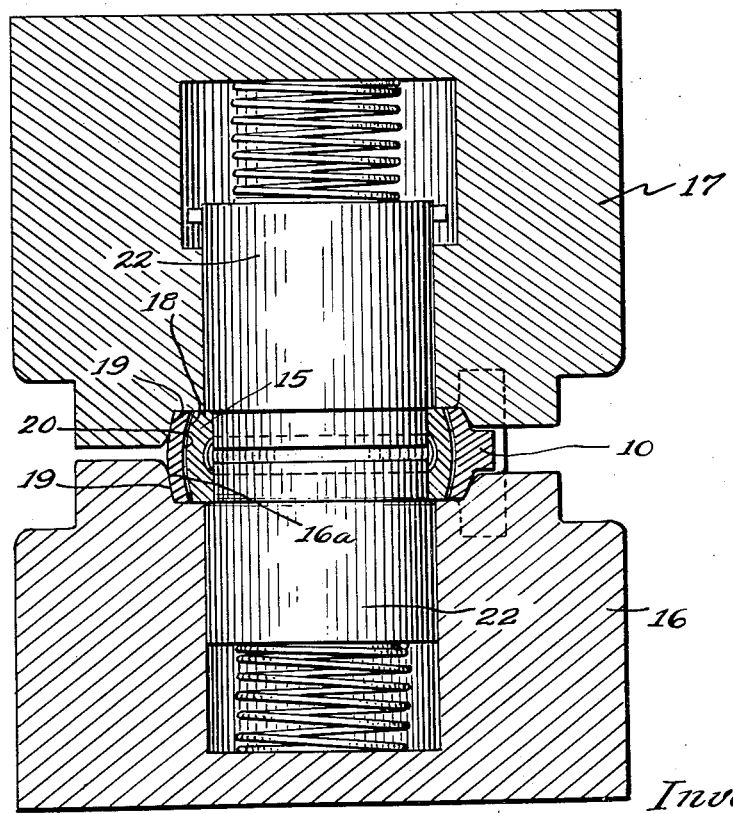
Figure 3 shows the manner in which the pillow block is swaged over the outer race to provide the self-aligning feature.

The steel outer race 15 of the rolling bearing structure that is to be housed within the pillow block is then placed on resiliently supported pin 22 of lower swaging die 16 and the pillow block blank 10 is placed about race 15 and slightly inside the die opening 16a (see Figure 3) and below swaging die 17 resiliently carrying a pin 22. The outer race 15 has a spherically shaped outer periphery, as indicated at 18, and the die faces 19 are shaped so that, as the dies 16 and 17 close, the bearing housing portion 12 of the blank is swaged into spherical conformity with the outer race. The concave spherical surface 20 thus formed on the inner wall of the bearing housing 12 coacts with the convex spherical shape of the outer race periphery 18 to permit the outer race to have universal movement with respect to the pillow block support.

In forming the spherical seat in the pillow block for the outer race 15, it is preferable that the outer race be machined to provide a few thousandths clearance when inserted within the cylindrical opening 14 of the blank 10 so that the outer race 15 may be freed from binding action caused by swaging by merely striking a few sharp blows endwise on the outer race and from both sides thereof, in the manner indicated in Figure 4. This may be accomplished in any convenient manner, and in Figure 4 there is shown a shouldered pin 21 engaging the end wall 23 of the outer race 15, with the pillow block resting against stationary die 21a. One or more sharp blows applied to the end of the pin 21 against one side of race 15, and after the unit is turned over, against the other side thereof, tend to increase the radius of the concave surface 20 of the bearing housing 12 by spreading the sides thereof so that the outer race is free to rotate in its intended manner.

Obviously, this working of the material is possible only because the pillow block is made of suitable ductile or malleable material. It may here be observed that, in the conventional cast iron pillow blocks of either two-piece construction or provided with mounting slots, the cast iron is brittle, and, of course, cannot be worked in this manner, and, as a result, the concave, spherically shaped face 20 of the pillow block must be machined with a single point tool, which is both laborious and costly.

After the outer race 15 has been mounted and secured within the pillow block blank, in the manner just described, the partly completed assembly is placed on its side, and the bearing assembly completed by placing within the outer race the bearing inner race 24, and then dropping into the crescent-shaped space 26 (see Figure 5) the required number of balls 27, after which the inner race 24 may be moved to its central position with the balls properly spaced within the ball bearing grooves 28 and 29, which are provided in the outer and inner races, respectively. Retaining rings 30 and 31 (see Figure 7) are inserted from the sides of the bearing and riveted or clamped together in a conventional manner to properly hold the balls in their proper spaced relationship within the bearing grooves. The bearing is then sealed with sealing rings 32 and 33.

In order for the bearing to have maximum load capacity, it is desirable to insert as many balls as is possible between the inner and outer races of the bearing, and this may be readily accomplished by our method due to the ductility or malleability of the pillow block material.

Referring again to Figure 5, as many balls 27 are placed in the crescent shape 26 as possible, and then pressure is applied against the top and bottom of the pillow block, as indicated by arrows, to deform the bearing housing 12 and outer race 15 to elliptical shape, as shown in somewhat exaggerated form in Figure 5, whereupon an additional ball, say, 34, may be forced downwardly into the crescent-shaped space 26, with the result that this forces an end ball 35 so that its center is just below the center line 36 of the inner race, wherefore when the pressure is relieved on the bearing housing the parts spring back to their normal shape (the pressure exerted being limited so as not to exceed the elastic limits of the materials involved), and the inner race is moved to its normal central position with the balls spaced about the bearing.

It will be apparent to those skilled in the art that the method for making the pillow block type self-aligning rolling bearing just described has many advantages over prior art methods. First and foremost is the fact that the machining operation commonly employed for forming the concave spherical surface 20 in the bearing housing 12 of the pillow block is avoided, as is also the necessity of machining mounting slots, when such are used. In addition, the bearing structure produced by our method is superior due to the fact that the pillow block support for the bearing is continuous throughout the periphery of the bearing, which, as compared to units having mounting slots, gives the bearing greater ability to withstand thrust loads. The absence of the bearing slots also means that the self-aligning portion of the bearing unit is kept clean and free from dirt that can cause wear or impede the free, universal movement of the bearing with respect to its housing. The ductility of the pillow block housing also makes it less subject to fracture when subjected to accidental blows.

It will be obvious that our method is applicable to other types of bearing units that include housings formed from materials such as those above specified, as illustrated by Figure 8, which shows a flange type bearing unit 40 produced by our method. Unit 40 includes a bearing assembly of the type shown in Figure 7 mounted in seat 20a, of flange housing 10a that is formed from a ductile or malleable material of the type specified above. Housing 10a includes flanges 42 appropriately formed with bolt or screw holes 44. Surface 20a is formed, and the outer race 15 applied thereto in the same manner as described above, and the bearing assembly completed as also described above.

Therefore, the term "pillow block" as used in the appended claims is intended to mean all rolling bearings that include a housing formed from the materials specified above regardless of the particular manner in which the housing is shaped for purposes of mounting the unit in operating position.

The term "ductile" as employed in the appended claims means all materials of the type mentioned in the specification as well as all suitable materials of the ductile or malleable type.

The term "rolling bearing" as used in this specification and in the appended claims is intended to include all forms of bearing units in which one or more members or elements are rolled between inner and outer race members. This term is meant to include units employing single and multiple rows of balls, rollers, and the like, and thus is synonymous with the term "antifriction bearing" widely used in the bearing art and is to be distinguished from plain type bearings or bearing units.

The terms "bearing" and "bearing assembly" as used in this specification and in the appended claims are intended to mean the combination of the inner and outer race members and the rolling elements associated therewith, whether assembled or unassembled.

A person skilled in the art will readily appreciate that our method may be modified within the scope of the appended claims. Such modifications are intended to be covered.

We claim:

1. The method of making pillow block rolling bearings which includes the steps of taking a pillow block blank formed of ductile material and provided with an integral ring-like portion, placing an outer race having a spherical outer surface within said ring-like portion, deforming said ring-like portion to conform same to the outer surface of said outer race, whereby the outer race is locked within said ring-like portion, but is mounted for universal pivotal movement therein, placing said outer race in the plane of said ring-like portion and eccentrically mounting an inner race within the outer race to form a crescent shaped space between the inner and outer race, filling said crescent shaped space with rolling bearings until a rolling bearing is pressed firmly against the inner and outer races at each end of the crescent shaped space, and no further rolling bearings can be pressed into said space, compressing said ring-like portion and said outer race laterally thereof to give said outer race an elliptical configuration with its minor axis extending through the center of said crescent shaped space, and pressing a further rolling bearing into said space, whereby one of the bearings at the ends of said space is forced past the center line of the inner race, and releasing the compression applied to said ring-like portion and said outer race, whereupon they return to their circular configurations, and said inner race is positioned concentrically of said outer race.

2. The method of making pillow block rolling bearings which includes the steps of taking a pillow block formed of ductile material and provided within an integral ring-like portion and a base, placing an outer race having a spherical outer surface within said ring-like portion, deforming said ring-like portion to conform same to the outer surface of said outer race, whereby the outer race is locked within said ring-like portion, eccentrically mounting an inner race within the outer race to form a crescent shaped space between the inner and outer races, filling said crescent shaped space with rolling bearings until a rolling bearing is pressed firmly against the inner and outer races at each end of the crescent shaped space, and no further rolling bearings can be pressed into said space, applying opposing compressive forces to said ring-like portion and said base to compress said ring-like portion and said outer race laterally thereof to give said outer race an elliptical configuration with its minor axis extending through the center of said crescent shaped space, and pressing a further rolling bearing into said space, whereby one of the bearings at the ends of said space is forced past the center line of the inner race, and releasing the compressive forces applied to said ring-like portion and said base, whereupon they return to their circular configuration, and said inner race is positioned concentrically of said outer race.

References Cited in the file of this patent

UNITED STATES PATENTS

| | | |
|---|---|---|
| 1,668,105 | Crow | May 1, 1928 |
| 2,633,627 | Olmstead | Apr. 7, 1953 |
| 2,724,172 | Potter | Nov. 22, 1955 |
| 2,728,975 | Potter | Jan. 3, 1956 |
| 2,794,691 | Noe | June 4, 1957 |